United States Patent [19]
Chapman

[11] Patent Number: 5,966,093
[45] Date of Patent: Oct. 12, 1999

[54] SINGLE BUTTON-MULTIPLE COMMAND POSITION AND STATUS CONTROL SYSTEM AND METHOD THEREFOR

[75] Inventor: Robert W. Chapman, North Miami Beach, Fla.

[73] Assignee: Chapman Technologies, Inc., Ft. Lauderdale, Fla.

[21] Appl. No.: 08/935,232

[22] Filed: Sep. 22, 1997

[51] Int. Cl.[6] ............................... G01S 5/02; G05B 9/02
[52] U.S. Cl. .................................... 342/357.17; 364/188
[58] Field of Search .................................. 364/146, 188; 342/357, 357.17; 701/213

[56] References Cited

U.S. PATENT DOCUMENTS

| | | | |
|---|---|---|---|
| 4,695,942 | 9/1987 | Levine et al. | 364/188 |
| 4,943,917 | 7/1990 | Mylne, III | 364/420 |
| 5,168,269 | 12/1992 | Harlan | 340/709 |
| 5,504,491 | 4/1996 | Chapman | 342/357 |

*Primary Examiner*—Mark Hellner
*Attorney, Agent, or Firm*—Robert C. Kain, Jr.

[57] ABSTRACT

The status command and communication device has a single user actuatable control input which is configured as a switch. The switch has a first and a second output state and the system monitors the switch and generates a first, second, and third status commands based upon the detection of first, second and third predetermined sequential switch output states. Based upon the status commands, the command and communication device generates a position signal based upon GPS position locating signals. The device further transmits the position signal and the status commands to a central station which, in turn, generates responsive communications to the device. Other passive input devices are included in the command and communication device (e.g., microphone) as well as an on/off switch. The device also includes, in a preferred embodiment, audio outputs and visual outputs for the user. The method includes monitoring switch output states, generating status commands based upon a plurality of detected, predetermined, timed and sequential switch output states, capturing the GPS position locating signals and transmitting a position signal and the status commands from the device dependent upon the status commands.

15 Claims, 3 Drawing Sheets

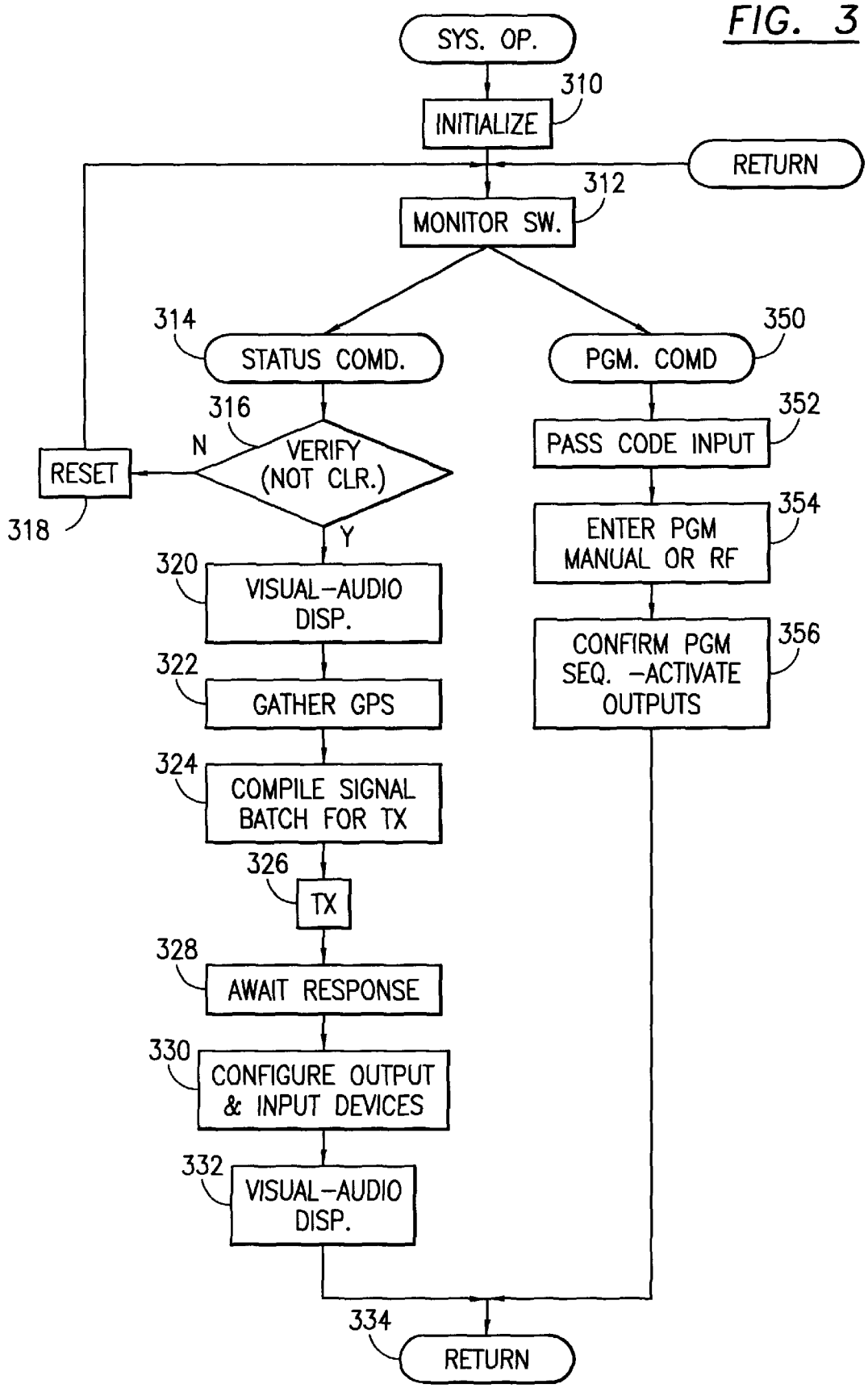

SINGLE BUTTON-MULTIPLE COMMAND POSITION AND STATUS CONTROL SYSTEM AND METHOD THEREFOR

The present invention relates to a status command and communication device having a single, user actuatable control input and a method therefor.

BACKGROUND OF THE INVENTION

U.S. Pat. No. 5,504,491 to Chapman discloses a global status and position reporting system. In the Chapman '491 system, a remote unit has a plurality of sensors, configured in one embodiment as five switches, which establish status commands for the remote unit. These status commands are combined with global position satellite or GPS position signals received by the unit. The status commands or signals are transmitted with the GPS position signal to a central location. At a central control station, an operator or a specially configured computer system reacts to the status commands and the GPS locating signal and responds either directly to the remote unit or to the appropriate, predetermined companies or initiates an appropriate activity. For example, the central control unit may contact emergency medical systems, the police, the fire department, or an anti-theft unit. Further, the central control station may contact a concierge operator or an emergency road service or an operator who can provide directions for the person at the remote unit to direct that person to an appropriate destination. The disclosure of U.S. Pat. No. 5,504,491 is incorporated herein by reference thereto.

OBJECTS OF THE INVENTION

It is an object of the present invention to provide a status command and communication device which is simple to operate.

It is another object of the present invention to provide a status command and communication device which, dependent upon the number of times the user depresses a switch, generates status commands as well as GPS position locating signals and sends those status commands and locating signals to a central control station.

It is an additional object of the present invention wherein the status commands, dependent upon the sequential depression of the switch, reconfigure the command and communication device to provide certain audio and visual outputs to the user and further configure certain passive input devices.

It is an additional object of the present invention to provide a status command and communication device which is programmable.

It is another object of the present invention to provide a method wherein the only user actuatable control input is a switch and status commands are based upon a plurality of detected, predetermined, timed and sequential switch output states.

SUMMARY OF THE INVENTION

The status command and communication device has a single user actuatable control input which is configured as a switch. The switch has a first and a second output state and the system monitors the switch and generates a first, second, and third status commands based upon the detection of first, second and third predetermined sequential switch output states. Based upon the status commands, the command and communication device generates a position signal based upon GPS position locating signals. The device further transmits the position signal and the status commands to a central station which, in turn, generates responsive communications to the device. Other passive input devices are included in the command and communication device (e.g., microphone) as well as an on/off switch. The device also includes, in a preferred embodiment, audio outputs and visual outputs for the user. The method includes monitoring switch output states, generating status commands based upon a plurality of detected, predetermined, timed and/or sequential switch output states, capturing the GPS position locating signals and transmitting a position signal and the status commands from the device dependent upon the status commands. Methods include: (1) a switch depression for various time periods and (2) multiple depressions within a time period. Method 2 is preferred.

BRIEF DESCRIPTION OF THE DRAWINGS

Further objects and advantages of the present invention can be found in the detailed description of the preferred embodiments when taken in conjunction with the accompanying drawings in which:

FIG. 3 diagrammatically illustrates a system operational flow chart for the status command and communication device.

DETAILED DESCRIPTION OF THE PREFERRED EMBODIMENTS

The present invention relates to a single button, multiple command position and status control system and a method therefor.

Figure 1:
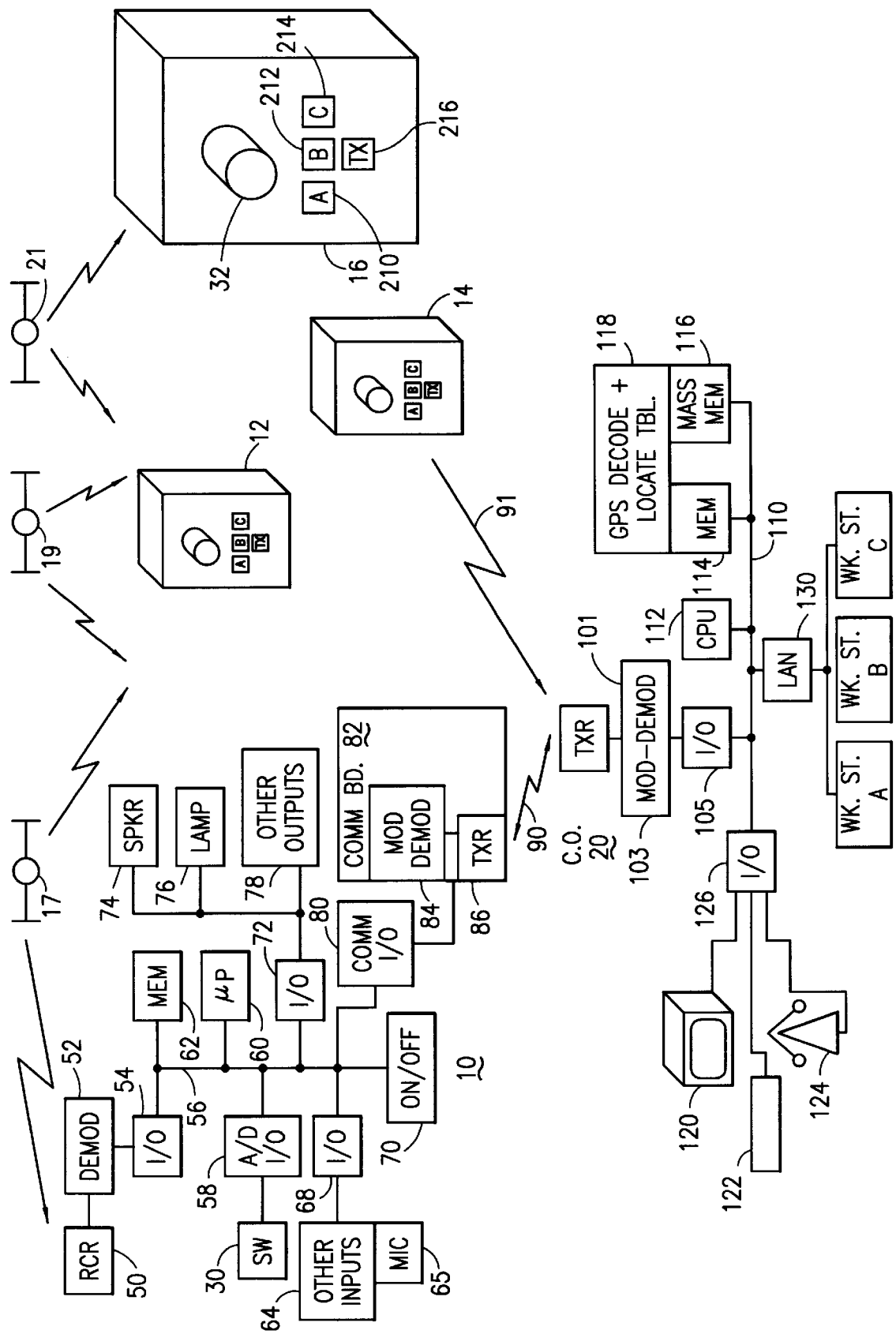
FIG. 1 diagrammatically illustrates the status command and communication device, the global position satellite system and the central control station (it also illustrates a plurality of command and communication devices in communication with the central control station)

FIG. 1 diagrammatically illustrates a system diagram of status command and communication device 10, a plurality of command and communication devices 12, 14 and 16, a global position satellite system illustrated by satellites 17, 19, 21 and a central control station 20. Status command and communication device 10 includes a switch 30 which is the sole user actuatable control input for remote unit or device 10. With respect to status command and communication device 16, this input is depressible switch 32. Essentially, the user depresses switch 30, 32 in a predetermined manner to generate certain status commands. For example, the user could depress switch 30, 32 once over a two second period, twice over a four second period or three times over a six second period in order to generate first, second and third status commands, respectively. To reset or clear status command and communication devices 10, 12, 14 and 16, the user may, for example, depress switch 30, 32 four times over a times span of eight seconds. Of course, other predetermined sequential switch output state detection routines could be incorporated into the status command and communication device to generate the first, second and third status commands and reset command.

The global position satellite system includes a plurality of satellites 17, 19 and 21 which flood a large geographic area (for example a state, a nation or a continent) with global position satellite or GPS position locating signals. The signals are gathered or captured by receiver 50 in status command and communication device 10. Demodulator 52 demodulates this signal and input/output device 54 presents the position signal to bus 56. Of course, as explained in U.S. Pat. No. 5,504,491 to Chapman (incorporated herein by reference thereto), receiver 50 receives several GPS position locating signals from several satellites 17, 19 and 21.

Switch 30 has a first and a second switch output state. These output states are applied to analog to digital input/output device 58 which, in turn, applies those converted signals to bus 56. Microprocessor 60, in conjunction with memory 62 continually monitors or polls the output of A to D converter 58 in order to determine whether the user or other situation has caused a change in the state of switch 30.

Functional block 64 provides other inputs to the status command and communication device 10. These other inputs are passive inputs which are shown below in the Passive Input Table.

Passive Input Table

Microphone

Digital still camera

Video camera

Input/output device 68 converts these passive inputs from unit 64 into a digital format such that microprocessor 60, in conjunction with memory 62, can process the status at status command and communication device 10. Microphone 65 is a passive input. In addition, device 10 includes an on/off switch 70. In a preferred embodiment, on/off switch 70 simply puts microprocessor 60 "to sleep." In the sleep mode, microprocessor 60 in the associated electronic devices utilize only minimal levels of energy from a power source, such as a battery. This power source is not shown in FIG. 1. Microprocessor 60 may also include a timer which puts the system to sleep after the expiration of a time-out period. In this programmable "sleep" mode, the output state of the switch is monitored by the microprocessor.

Status command and communication device 10 also includes input/output unit 72 which is connected to various user outputs. These user outputs include, in a preferred embodiment, an audio output or speaker 74, a lamp, light emitting diode or LED panel or series of lights, or other light 76 (lamp 76 may be a plurality of lights or display systems) and other passive outputs 78. The Other Output Table set forth below identifies other outputs that may be driven by input/output device 72 under the control of microprocessor 60.

Other Output Table

Speaker

Siren

Multiple Lights

LED display

Interface with car alarm, home alarm, telephone line communications link

Interface with transponder unit

Pager

An important feature of the present invention is the communication with a central control station C.O. 20. This is accomplished via a communications input/output device 80 which converts the signals from bus 56 under the control of microprocessor 60 to a communications board 82. On the communications board a modulator/demodulator 84 and a transmitter/receiver 86 is provided. In a preferred embodiment, transmitter 86 is a personal communications system transmitter or a cellular telephone transmitter. In any event, status commands and position signals, unique to the specific geographic location of status command and communication device 10 are sent over radio frequency RF communications link 90 to a transmitter/receiver TX 101 at central office 20. The transmitter/receiver 101 is connected to modulator/demodulator 103. The output of modulator/demodulator 103 is applied to input/output device 105. The output of input/output device 105 is applied to a bus 110 at the central office 20. The signals on bus 110 are handled by central processor or CPU 112. CPU 112 utilizes memory 114 and mass or large storage memory 116. Memory 114 and mass memory 116 includes GPS decoding and locating tables 118. These tables are utilized to locate the specific geographic location of status command and communication device 10 as compared with the specific geographic location of status command and communication device 14. As noted in FIG. 1, device 14 is also communicating over telecommunications path 91 to transmitter/receiver 101 of central office 20.

In certain situations, central office 20 may utilize a human operator to decipher the status command and communication signals received from remote devices 10, 12, 14 and 16. The human operator utilizes monitor 120, keyboard 122 and an associated mouse and a telephone or other telecommunications device 124. These devices are connected to CPU 112 and bus 110 via input/output device 126. Since a plurality of remote status command and communication devices 10, 12, 14 and 16 are utilized, several operators may be necessary at central location 20. These operators are connected to CPU 112 via a local area network diagrammatically illustrated as LAN 130. These other operators are positioned at work stations A, B and C in FIG. 1 (Wk. St. A, B, and C)

Returning to the remote status command and communication devices 10, 12, 14 and 16, the sole user actuatable control input switch 30, 32 can be one of the number of switches. The following Switch Table provides some examples.

Switch Table

Push button

Two position slide

Touch screen

Piezoelectric

All these switches shown in the Switch Table have a first and a second switch output state. A primary objective of the present invention is to provide a simple status command and communication device which can be operated with minimal instruction to user. In a medical situation, if the user desires to simply contact a primary care person, the user may strike switch 30, 32 a single time. If the user wants to have central office 20 call his or her physician, the user may strike switch 30, 32 twice in two seconds. In a critical medical emergency, if the user wants central office 20 to call EMS or Emergency Medical Services, the user strikes switch 30, 32 three times in, for example, six seconds. Remote device 10, 12, 14 and 16 monitors the output states of switch 30, 32, determines which of a plurality of status commands should be issued, gathers GPS position signal data for that remote device and transmits the GPS position data and the status command to the central office 20 after detecting the completion of the control input sequence.

In order to alert the user regarding the selection of a status, the remote device 10, 12, 14 and 16 may include one or more audio outputs or one or more visual outputs. With respect to visual outputs, these outputs are specifically identified on remote device 16. Status command A would result in the system illuminating region 210 on the visual display screen. This visual display screen may be one of a plurality of lights, may be a progressively lightable LED screen or may be a single LED screen having a plurality of lightable regions thereon. If the second status command is generated by the user based upon the depression of the sole user actuatable control switch input 32, lighted area B 212 is lit. If the third status command is activated, lighted area C 214 is lit. In addition, microprocessor 60 in conjunction with memory 62 may audibly announce the selected status command. Again, in the medical emergency situation, a single depression may result in remote unit 10 announcing "we have called your primary care person." If status command 2 was issued, the unit may audibly announce "we have called your physician." If status command 3 is activated by the user, the system may audibly announce "we have called the ambulance."

In addition to these visual outputs, device 16 may include a further light or LED 216 which indicates that the remote unit has successfully transmitted TX the status command and position signal to the central office 20. Alternatively, transmission TX light 216 could be activated when central office 20 responds to the remote unit. Other visual outputs may be provided by TX lamp 216. For example, when the remote unit is seeking to communicate or send a batch of signals to central office 20, TX light 216 may blink. When central office 20 responds back to remote unit 10, TX light 216 may be a "steady ON" light.

Figure 2:
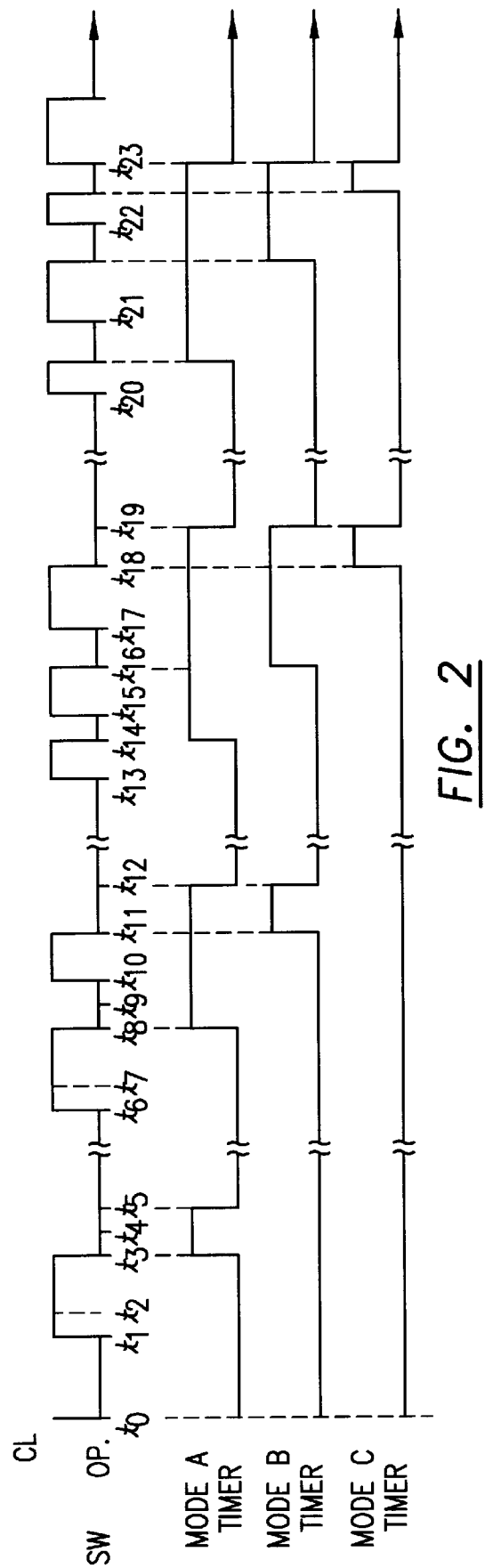
FIG. 2 diagrammatically illustrates an exemplary timing diagram which illustrates the switch monitor and the generation of first, second and third status commands based upon sequential, predetermined switch output states.

FIG. 2 diagrammatically illustrates one example of the switch monitor which determines when first, second and third status commands are issued based upon first, second and third predetermined sequential switch output states. The operation of the switch is as follows: a low signal in FIG. 2 indicates that the switch is open whereas a high signal indicates that the switch is closed. In the illustrated embodiment, microprocessor 60, in conjunction with memory 62, maintains timers for status commands A, B and C. In the timing diagram shown in FIG. 2, the status command timers are shown as mode A timer, mode B timer and mode C timer. The following Exemplar Timing Table describes timing diagram FIG. 2.

Exemplar Timing Tabler

| Time | Event |
|---|---|
| $t_1$ | switch closes |
| $t_1$–$t_2$ | switch bounce period |
| $t_2$ | switch close set mode A timer |
| $t_3$ | switch open - start mode A timer |
| $t_3$–$t_4$ | switch bounce period - if sw. high at $t_4$ then reset mode A timer |
| $t_3$–$t_5$ | time out period for mode a timer |
| $t_5$ | on falling edge, microprocessor activates mode A response from remote, clear timer |
| $t_6$ | switch closes |
| $t_6$–$t_7$ | bounce |
| $t_8$ | switch opena, start mode A timer |
| $t_8$–$t_9$ | bounce |
| $t_{10}$ | switch closes, re-start mode A timer |
| $t_{11}$ | switch opens, start mode B timer |
| $t_{12}$ | time out on mode B timer, activate mode B response, clear timers |
| $t_{13}$ | switch closes |
| $t_{14}$ | switch opens - start mode A timer |
| $t_{15}$ | switch closes - re-start mode A timer |
| $t_{16}$ | switch opens - start mode B timer |
| $t_{17}$ | switch closes - re-start mode A and B timers |

Exemplar Timing Tabler -continued

| Time | Event |
|---|---|
| $t_{18}$ | switch opens - start mode C timer |
| $t_{19}$ | time out on mode C timer - activate mode C response, clear timers |
| $t_{20}$ $t_{21}$ $t_{22}$ | see events set mode A, B and C timers above |
| $t_{22}$–$t_{23}$ | less than $t_{18}$–$t_{19}$ - the time out period for mode C timer |
| $t_{23}$ | re-set all mode timers and cancel modal responses |

It is well recognized that upon depression of any switch, the system should account for an electronic problem identified as "switch bounce." Switch bounce occurs when the switch is depressed and the polling of microprocessor 60 detects the output of analog to digital input/output device 58 either during the middle of the switch depression or shortly thereafter. In the present embodiment, since device 10, 12, 14 and 16 is embodied in a relatively small housing (not more than 4"×4"×6"), there is a possibility that the device may fall from a table, chair or bed and strike the ground. This may result in a temporary change in switch output state. The term "switch bounce" is meant to encompass this and other mechanical problems raised by the utilization of certain switches. Basically, the electronic system discounts switch output state activity during time periods less than the switch bounce time.

Although the timing diagram in FIG. 2 may be utilized, there are may other computer programs or routines and timing configurations that could be utilized to determine the sequential or time-based change in switch output states. For example, the user may depress switch 30, 32 for a full four seconds in order to achieve command status 1 or A, depress the switch for ten seconds to achieve status B or depress the switch for fifteen seconds to achieve status C. In such a situation, microprocessor 60 and memory 62 (FIG. 1) could be programmed to monitor the predetermined sequential switch output states based exclusively on the total amount of time the switch has been depressed by the user.

The following Exemplar Control Sequence Table outlines some of the status commands that may be triggered based upon the 1-2-3 depression of the sole user actuatable control switch 30, 32.

Exemplar Control Sequence Table (all with GPS)

Personal Emergency Service
  1. Two-way audio
  2. Listen only audio (one-way transmit)
  3. Hands free audio
or
  1. Hands free voice (one-way audio transmit)
  2. Two way audio
  3. Video frames or digital still pictures
Tracking—Kidnap Service
  1. Periodic burst GPS with high priority alarm
  2. Listen only
  3. Error mode
Summons Help
  1. Summons EMS
  2. Summons Police
  3. Summons Fire
or
  1. Summons primary care person
  2. Summons doctor
  3. Summons EMS or 1. Periodic listen (one-way audio)
2. Two-way audio
3. Summons EMS Vehicular 1. Tracking and summons police
2. Locate and summons roadside service (e.g. one-way audio)
3. Locate and provide routing assistance (two-way audio)

or

1. Remote door unlock
2. Activate car alarm
3. Kidnap—Locate and summons police

Secure House Arrest

1. One-way audio (periodic listen in)
2. Two-way audio
3. Locate and periodic track For example, with respect to the personal emergency service, the user depresses switch 30, 32 a single time for two seconds in order to establish a two-way audio communications link between remote unit 10 and central office 20. In this programmable mode of operation (status A or 1), remote unit 10 configures or compiles status command A with a GPS position locating signal data, prepare that signal communications batch and transmit that batch over cellular, land link or fiber optic telecommunications link 90 to central office 20. An operator at work station A (Wk.St. A) responds by speaking into an associated telephone unit. This response is configured as a responsive communications signal packet or batch sent via telecommunications link 90 to transmitter/receiver 86 in remote status command and communication device 10. Microprocessor 60, in conjunction with memory 62, converts those signals and audibly announces the operator's voice via speaker 74 to the user. The user then explains the situation to the operator at work station A by speaking into microphone 65 which is one of the passive inputs 64. Microprocessor 60, in conjunction with memory 62, obtains these audible signals from the user, converts them, packages those representative signals into a communications batch signal and transmits those signals via telecommunications link 90 back to central office 20.

Returning to the personal emergency service program configuration, if status B is initiated by the user, the remote unit simply listens in or establishes a one-way audio telecommunications link with central office 20. This "listening in" mode may be "always on" wherein operator at work station A always records and listens to the sounds near remote unit 10. Alternatively, the "listen in" mode may periodically establish a one-way audio link from remote device 10 to central office 20. For example, the audio link may be established between remote unit 10 and central office 20 once every 10 minutes. Of course, the audio link may be established more frequently or less frequently dependent upon the program for the personal emergency service. For example, in the secure house arrest mode, a one-way "listen in" audio link may be established once per hour. Returning to the personal emergency service program, if mode C or option 3 is selected by the user upon depression of switch 30, 32 three times within a predetermined time period, hands free audio operation is established.

In the situations set forth in the Control Sequence Table above, microprocessor 60, in conjunction with memory 62, configures not only the input devices 64, 65 for remote unit 10 but also the output devices 74, 76 and 78. This configuration of input and output devices is programmable.

With respect to the timing diagram in FIG. 2, one embodiment of the present invention clears all the status command counters upon depression of switch 30, 32 four times within a predetermined time period, for example, ten seconds. However, other resets could be utilized. For example, if the user depresses switch 30, 32 and maintains that depressed switch state for, for example, five seconds, the remote unit could clear all the status command counters A, B and C.

FIG. 3 diagrammatically illustrates a systems operation flow chart showing the major functional aspects of the program in remote unit 10. In step 310, microprocessor 60, in conjunction with memory 62, initializes the system. In step 312, the system monitors switch 30. If monitoring senses a status command 314, the program activates a decision in step 316 which verifies that a status command has been entered by the user. In other words, decision step 316 determines whether the user has cleared the status command registers or timers. If the NO branch is taken from decision step 316, this indicates that the user has cleared the registers. The system resets those registers or timers in step 318. The system then returns to a point immediately prior the monitor switch step 312. If the user has not cleared the status commands, the YES branch is taken from decision step 316.

In step 320, the remote unit either visually or audibly displays the selected status command. In step 322, the remote system gathers the GPS locating signals or position data. In step 324, the system compiles the location signals unique to the remote device along with the status command. These signals are compiled and batched for transmission via telecommunications link 90 to central office 20. In step 326, the system transmits TX the information to central office 20. In step 328, the system awaits a response or a responsive communication from central office 20 to the remote unit 10. In step 330, microprocessor 60 and memory 62 configure the input and output devices in the remote unit 10. In step 332, the microprocessor displays visually and audibly, if necessary, the responsive communications from central office 20. The system then goes to return step 334 which returns the system to a point immediately prior to the monitor switch step 312.

If microprocessor 60 and memory 62 are provided with a programming status command dependent upon sensing a certain sequential depression of switch 30, 32, the system branches to program command 350. In step 352, the programmer inputs a passcode into the remote unit. This passcode input is the depression of switch 30, 32 in a certain manner in over a certain predetermined time frame. Step 354 enables the programmer to either manually enter the program or program microprocessor 60 and memory 62 based upon a radio frequency or RF communications link established between a programming unit (not shown) or the central office 20. In step 356, the system confirms the program sequence by activating certain visual and/or audio outputs of the device. The system then goes to return step 334 which returns to the operation immediately prior to the monitor switch step 312. The claims appended hereto are meant to cover modifications and changes within the scope and spirit of the present invention.

What is claimed is:

1. A status command and communication device having a single user actuatable control input operating in conjunction with a global position satellite system generating GPS position locating signals and a central control station located at a site remote from said device, said central control station adapted to receive status and position signals from said device and to transmit responsive communications to said device, the status command and communication device comprising:

a switch, having a first and a second switch output state, adapted to be actuated by a user;

said switch being the sole, exclusive user actuatable control input for selecting status commands for said status command and communication device;

a small-sized housing onto which is mounted said switch;

means for generating a position signal, disposed in said housing, based upon said GPS position locating signals from said global position satellite system;

switch monitoring means coupled to said switch for detecting and generating first, second and third status commands based upon corresponding first, second and third predetermined, sequential, time based switch output states; and, means for transmitting said position signal and said status commands from said housing to said central control station, said means for transmitting coupled to said means for generating said position signal and said switch monitoring means.

2. A status command and communication device as claimed in claim 1 wherein said housing being free of all other user actuatable switches for selecting status commands, said device includes one of an audio output and a visual output for said user, said device including means for generating a plurality of user outputs based upon said status commands via said one of said audio output and said visual output.

3. A status command and communication device as claimed in claim 2 wherein said device includes means for receiving said responsive communications from said central control station and means for configuring said one of said audio output and said visual output based upon said status commands from said switch monitoring means and said responsive communications from said central control station.

4. A status command and communication device as claimed in claim 3 wherein said device includes said audio output for said user and said means for configuring selects said audio output in the presence of one of said first, second and third status commands from said switch monitoring means.

5. A status command and communication device as claimed in claim 4 wherein responsive communications from said central control station includes audio representative signals and said means for configuring includes means for directing said audio representative signals to said audio output.

6. A status command and communication device as claimed in claim 5 wherein said device includes a microphone disposed in said housing and generating audible sound representative signals thereat, said device includes means for converting and transmitting said audible sound representative signals to said central control station in conjunction with said means for transmitting.

7. A status command and communication device as claimed in claim 1 wherein said switch is a two position switch.

8. A status command and communication device as claimed in claim 2 wherein said device includes said visual output for said user, said visual output including one of a plurality of lights, a progressively lightable light emitting diode screen, and a light emitting diode screen having a plurality of lightable regions.

9. A status command and communication device as claimed in claim 1 including an ON/OFF power control coupled to means for disabling said means for transmitting, said ON/OFF power control independent of said switch which is the sole user actuatable control input for selecting said status commands.

10. A method of controlling a status command and communication device utilized in conjunction with a global position satellite system generating GPS position locating signals and a central control station located at a remote site, said central control station adapted to receive status and position signals from said device and to transmit responsive communications, the method comprising the steps of:

providing a singular, exclusive switch, mounted onto a small-sized housing, said switch being the sole user actuatable control input for said device and having a first and a second switch output state;

monitoring said switch output state and generating user initiated status commands based exclusively upon a plurality of detected, predetermined, timed and sequential switch output states;

capturing said GPS position locating signals and transmitting a position signal and said status commands from said device dependent upon said status commands.

11. A method of controlling as claimed in claim 10 including the step of receiving, converting and audibly announcing said responsive communications from said central control station dependent upon said status commands.

12. A method of controlling as claimed in claim 10 including the step of capturing, converting and transmitting, with said position signal and said status commands, representative signals replicating audible sounds near said device.

13. A method of controlling as claimed in claim 10 including visually presenting, to the user, representations of said status commands obtained during the step of monitoring and generating.

14. A method of controlling as claimed in claim 13 including the step of receiving, converting and audibly announcing said responsive communications from said central control station dependent upon said status commands.

15. A method of controlling as claimed in claim 14 including the step of capturing, converting and transmitting, with said position signal and said status commands, representative signals replicating audible sounds near said device.

* * * * *